Patented Oct. 31, 1944

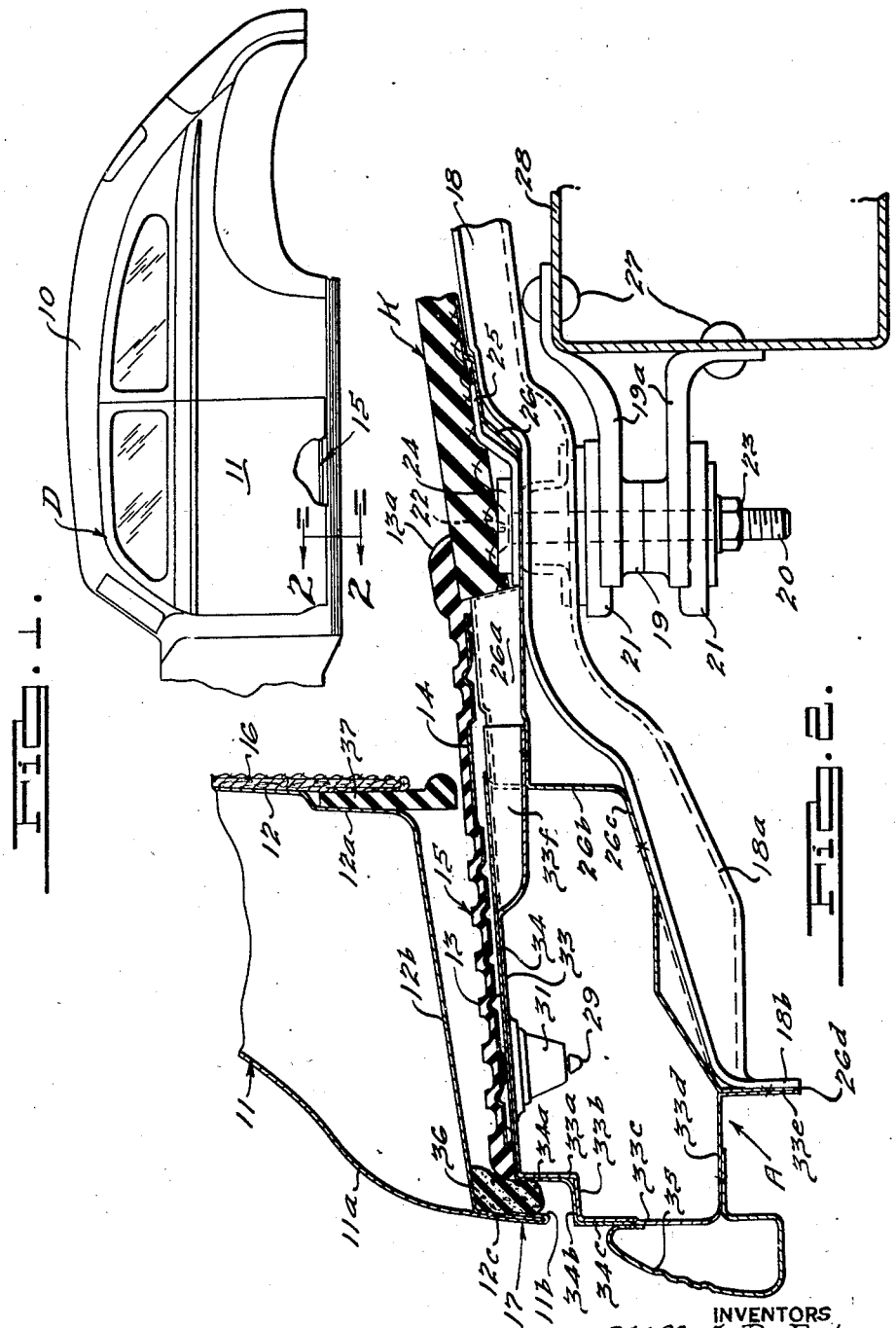

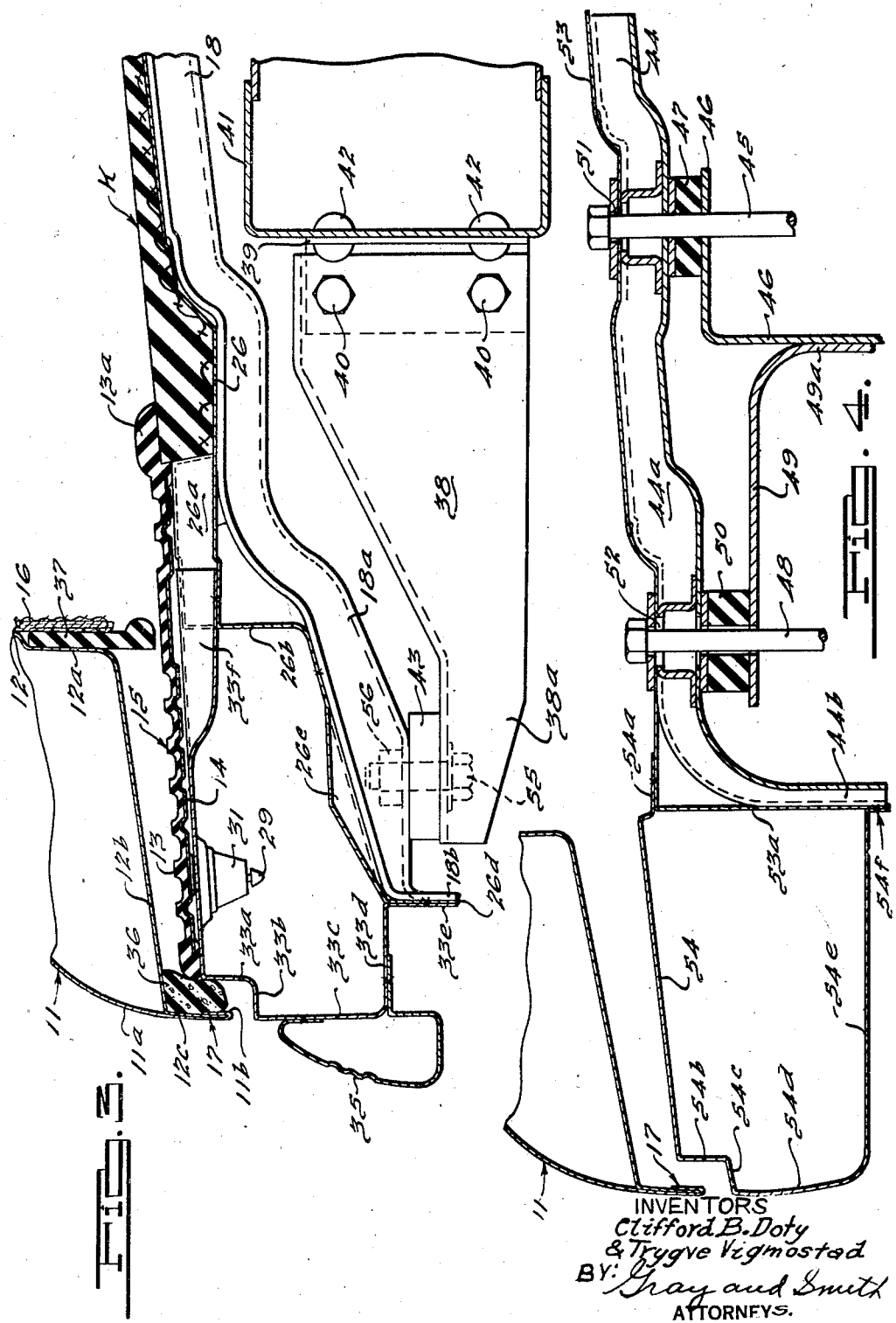

2,361,610

UNITED STATES PATENT OFFICE 2,361,610

VEHICLE BODY

Clifford B. Doty and Trygve Vigmostad, Detroit, Mich., assignors to Briggs Manufacturing Company, Detroit, Mich., a corporation of Michigan Application December 6, 1941, Serial No. 421,910

19 Claims. (Cl. 280—163)

This invention relates to framework for vehicles and more particularly to vehicle construction in which the body superstructure overhangs the side walls of the chassis and extends over a running board or laterally extending sill of the internal or concealed type.

There are two general types of running boards or stepping means by which passengers may enter and leave the passenger compartment of the body of a motor vehicle. One may be called the external type which generally consists of a stepping member extending laterally along each side of a vehicle intermediate the wheels and supported by brackets or the like extending from the chassis externally of the body superstructure. The other construction or type of running board may be called the internal or concealed type and comprises generally a laterally extending stepping means along each side of the body superstructure and housed entirely or partially therein. This type of running board is usually located immediately below the lower edge of the vehicle door and concealed thereby.

It has been the practice in many instances in connection with the concealed or internal type running board to locate the same in a plane substantially flush with the floor of the body superstructure so that a passenger need take only one step to enter the body compartment of the vehicle. Running boards of this type extend laterally or outwardly a considerable distance from the chassis frame or sills and because of this fact considerable difficulties have been experienced in providing proper support for the running board on account of its great overhanging and also to provide a running board or sill construction which will be sufficiently rigid to withstand the weight placed thereon by persons entering or leaving the car.

An object of the invention is to provide an improved running board structure for a vehicle which in effect is formed in part as an extension of the vehicle floor pan or sheet and which is strong, rigid and firmly supported from the chassis frame member.

A further object of the invention is to provide an improved supporting means for a running board of the internal or concealed type, which supporting means is secured to a cross frame member overhanging and in turn attached to the longitudinal chassis frame of the motor vehicle.

It is another object of the invention to provide an improved running board structure of the foregoing type which comprises angular extensions of the vehicle body floor pan and door sill secured together to provide a box-like member supported by members extending outwardly from the main frame.

Another object of the invention is to provide an improved running board structure of the internal or concealed type which comprises extensions of the vehicle body floor pan and door sill secured together to form a substantially box-like member extending longitudinally beneath the lower edge of the vehicle door or doors, said box-like member being secured to and supported by a transversely extending frame member supported from the vehicle chassis.

A further object of the invention is to provide a running board structure of the internal or concealed type which is relatively simple to construct, capable of withstanding great weight and which permits the body superstructure to conform to modern streamlined design of motor vehicles.

Other objects of this invention will appear in the following description and appended claims, reference being had to the accompanying drawings forming a part of this specification wherein like reference characters designate corresponding parts in the several views.

Fig. 1 shows a body superstructure of a motor vehicle illustrating a running board of the internal or concealed type embodying the present invention.

Fig. 2 is an enlarged sectional view taken through lines 2—2 of Fig. 1 looking in the direction of the arrows.

Fig. 3 is a sectional view similar to that of Fig. 2 illustrating an alternative means for supporting the running board shown in Fig. 1 from the chassis frame of a motor vehicle.

Fig. 4 is a sectional view illustrating a modification of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

There is illustrated in Fig. 1 a body 10 for a motor vehicle having a passenger compartment formed therein into which access may be had through a door D which when in a closed position completely overlies and conceals the upper portion of a running board generally designated at 15.

More particularly in Fig. 2 there is shown the concealed or internal type of running board 15 which extends laterally along each side of the body superstructure, intermediate the vehicle wheels and lies immediately below the lower edge 12b of the vehicle door D. When the door D is in a closed position the running board 15 is concealed within the vehicle body and lies in a plane substantially flush with the floor of the passenger compartment. The running board 15 is formed of a mat 13 which is of the non-skid type preferably formed of rubber and a backing or rigid reinforcing member or plate 14 usually constructed of metal.

Any suitable type of door may be used which is so constructed that its lower portion is adapted to completely cover the running board when the door is in a closed position. There is shown for the purpose of illustration in Fig. 2 a door of this type which is provided with outer and inner door panels 11 and 12, respectively, the outer door panel 11 being provided with an outwardly curved portion 11a along its lower portion which permits the bottom 12b of the door to completely cover the running board when the door is closed. This portion 11a of the outer door panel 11 terminates in an upwardly extending flange 11b to form the door overlap flange 17 which supports along its inner surface a resilient sealing strip 36 which engages the outer edge of the running board when the door is closed. The inner door panel 12 at its lower portion is provided with an embossed or inwardly bulged portion 12a which is adapted to receive the resilient sealing strip 37. Attached to the inner door panel is suitable upholstery material 16 in the form of a trim panel. At its lower edge the inner door panel 12 terminates in an outwardly sloping flange 12b which forms the lower edge of the door. At its outer edge the flange 12b terminates in a downwardly extending flange 12c which is pinched between the inner side of portion 11a of the outer door panel 11 and the upwardly turned flange 11b and is secured therein by any suitable means such as spot welding.

A plurality of transversely extending cross brace or frame members 18 overlie the spaced longitudinally extending chassis frame members or sills 28 at each side of the chassis intermediate the wheels of the vehicle. Each of the cross braces or members 18 is provided with an overhanging portion 18a which projects outwardly from the sill 28 and is supported therefrom by means of brackets 19 having arms 19a secured by means of rivets 27 or the like to the sill 28 of the vehicle chassis. The cross brace 18 is secured to the bracket 19 by means of a bolt 20 having a nut 23. The bolt is inserted through the cross brace 18 and the bracket 19, resilient pads 21 being interposed between the brackets and the bolt and the cross brace to absorb body vibrations and to prevent chatter.

The bolt 20 is further used to secure a transversely extending floor pan 26 to the cross brace. The bolt 20 is provided with a head portion 22 which rests within a recess formed within a washer 24 which seats against a clamping bar or member 25. The clamping bar 25 in turn presses against the floor pan 26, thus holding it securely in position against the cross frame member 18.

The pressed metal floor pan 26 which forms a part of the body superstructure is provided along its longitudinally extending edges within the body compartment of the vehicle substantially adjacent the lower inner edge of the door panel 12 with laterally spaced corrugations or raised portions 26a formed therein by any suitable process such as by stamping. At the outer edges of the raised portions 26a the floor pan extends downwardly forming a depending portion 26b which in turn terminates in an outwardly extending portion 26c, which portion seats along the upper edge of the overhanging portion 18a of the cross brace 18 and is secured thereto by spot welding. The outwardly extending portion 26c terminates at its outer edge in a downwardly extending flange 26d which is adapted to overlap and to be secured as by spot welding to a downwardly extending terminal flange 18b of the cross brace 18.

A generally outwardly sloping door sill plate 33 extending longitudinally along the outer edge of the body superstructure intermediate the vehicle wheels is provided along its inner edge with longitudinally spaced corrugations or raised portions 33f which are complementary in shape to the raised portions 26a of the floor pan 26 and are adapted to telescope or to extend over the raised portions 26a, being secured thereto by spot welding to form a rigid structure. At its outer edge the door sill plate 33 terminates in a depending portion 33a which in turn terminates in an outwardly extending portion 33b thus forming a recess or rabbet which is adapted to accommodate the door flange 17 and the sealing strip 36 secured along the inner surface thereof. Extending downwardly from the outer edge of the outwardly extending portion 33b and lying substantially in vertical alinement with the lower edge of the outer door panel 11 the sill plate 33 is further provided with a depending portion 33c which in turn terminates in a generally horizontal inturned portion 33d terminating at its inner edge in a downwardly extending flange 33e which is adapted to be secured by any suitable means such as by spot welding to the flange 26d of the floor pan 26.

The door sill 33 is reinforced by a surface or scuff plate 34 which conforms generally to the shape of the door sill 33 and is secured to the outer surfaces thereof by any suitable means. The surface plate 34 has flange portions 34a, 34b and 34c which correspond to portions 33a, 33b and 33c of the door sill 33.

A laterally extending trim member or molding 35 of any suitable design or configuration is secured by any suitable means, preferably spot welding, to the sill plate 33.

A suitable floor mat or covering K is provided which is adapted to conform substantially to the contour of the floor pan 26 and which underlies an overlapping portion 13a of the reinforced antiskid rubber mat 13 covering the running board 15. The mat 13 is secured to the sill 33 by a stud 29 extending through a boss 31.

Thus, it can be seen that a box-like running board structure 15 is provided comprising angular portions of the floor pan 26 and the door sill 33 secured together and supported at a distance from the main chassis frame member by outlying cross frame members 18.

In Fig. 3 there is disclosed an alternative method for supporting the cross frame member 18 from the vehicle chassis. In this instance the cross frame member 18 is secured to the frame sill 41 by means of a bracket or outrigger 38, which outrigger is secured to the frame sill by means of an angle bracket 39 secured thereto by bolts 40. The angle bracket in turn is secured to the frame sill 41 by means of rivets 42. The cross frame member 18 is provided with an outlying portion 18a which rests upon a generally horizontally extending portion 38a of the outrigger 38 and is secured thereto by means of a bolt 55 having a nut 56, a rubber pad or resilient member 43 being interposed between the cross brace and bracket to absorb body vibrations. It is to be noted that the running board structure is substantially the same as the construction shown in Fig. 1. A raised portion 26e has been provided, however, to permit access to the nut 56 for securing the frame 18 to the outrigger 38.

There is illustrated in Fig. 4 another embodiment of the present invention. In this embodiment a transversely extending cross brace 44, having an overhanging portion 44a on each side of the vehicle chassis, is secured to each of the longitudinal main frame members 46 by means of two downwardly extending bolts 45 and 48. The bolt 45 extends through an opening 51 in the cross brace and is secured directly to the frame sill 46. The bolt 48 extends through opening 52 in the overhanging portion 44a of the cross brace 44 and is secured to an outwardly extending bracket 49, which bracket is provided with a downwardly extending flange 49a spot welded to the outer side of the frame sill 46. Resilient pads 47 and 50, preferably formed of rubber, are interposed between the cross brace 44, frame sill 46 and bracket 49 to absorb body vibrations.

A floor pan 53 forming part of the body superstructure and extending transversely thereof is shaped to conform generally to the shape of the surface of the cross brace upon which it rests and to which it is secured by means of bolts 45 and 48.

At each outer edge the floor pan 53 is provided with a depending flange portion 53a which overlaps and is spot welded to the outer surface of a downwardly extending flanged extension 44b of the cross brace 44.

An outwardly sloping sill plate 54 having at its inner edge an inwardly disposed flange portion 54a is attached by spot welding to the upper surface of the floor pan 53. At its outer edge the sill plate 54 is provided with a vertical extending depending portion 54b which terminates at its lower edge in an outturned portion 54c which forms a recess or rabbet to accommodate the door flange 17 when the vehicle door 11 is in closed position. The sill plate 54 is further provided with a downwardly and inwardly curved portion 54d which terminates at its lower edge in a generally horizontally extending inturned portion 54e which in turn terminates at its inner edge in a downwardly extending flange 54f spot welded to the depending portion 53a of the floor pan 53.

Thus, a box-like construction formed of continuations of the floor pan 53 and the door sill plate 54 is provided which is supported from the main frame by the outlying extension of the cross member 46. This construction, as in the previous embodiments, provides a strong and rigid running board structure completely concealed from view when the door of the vehicle is in a closed position.

With reference to the several embodiments wherein the running board and frame structure is illustrated at only one side of the vehicle, it will be understood that in each embodiment the same construction is provided at the opposite side of the vehicle. Also it will be understood that a plurality of longitudinally spaced cross frame members 18 or 44, together with associated parts, will be provided for supporting the running board, also that the supporting means for the cross frame members 18 of Figs. 2 and 3 may be utilized in the same vehicle.

We claim:

1. A running board and floor structure for a vehicle having a door and a longitudinally extending chassis frame member, comprising a pressed metal floor pan, a pressed metal plate secured to the outer edge portion of the pan and extending outwardly therefrom to form therewith a box-like member underlying the lower edge of the door at a substantial distance outwardly from the frame member, and a cross member supported from the frame member and having a portion supporting the floor pan, said portion being extended for attachment to the box-like member.

2. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, and a cross member interposed between the floor pan and frame member and extended outwardly therefrom for attachment to said box-like member.

3. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, a cross member interposed between the floor pan and frame member and extended outwardly therefrom for attachment to said box-like member, and a bracket extending outwardly from the frame member for supporting said cross member.

4. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, a portion of the bottom of said box-like member being formed by said floor pan, and a cross member supported from the frame member and having its end underlying said bottom portion of the box-like member and also a terminal depending portion secured to a depending flange portion of said box-like member.

5. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, and a cross member supported from the frame member and attached at its outer end to the box-like member, said cross member engaging the underside of the floor pan and also a portion of the bottom of said box-like member.

6. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, and a cross member interposed between the floor pan and frame member and extended outwardly therefrom for attachment to said box-like member, said cross member engaging the underside of the floor pan and also a portion of the bottom of said box-like member.

7. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, a cross member supported from the frame member and having a terminal depending portion secured to a depending flange portion of said box-like member, and a bracket extending outwardly from the frame member for supporting said cross member.

8. A running board and floor structure for a vehicle having a door and a longitudinally extending chassis frame member, comprising a pressed metal floor pan, a pressed metal plate secured to the outer edge portion of the pan and forming therewith a box-like member underlying the lower edge of the door at a substantial distance outwardly from the frame member, a cross member supported from the frame member and attached at its outer end to the box-like member, said cross member engaging the underside of the floor pan and also a portion of the bottom of said box-like member, and a bracket extending outwardly from the frame member for supporting said cross member.

9. A running board and floor structure for a vehicle having a door and a longitudinally extending main frame member, comprising a pressed metal floor pan extended outwardly beyond said frame member and having a depending flange at its outer edge, a pressed metal sill plate secured at its inner edge in overlapping relation to the floor pan and extended outwardly, thence downwardly and thence inwardly to form three sides of a box-like member in which said depending flange forms the fourth side, said box-like member directly underlying the lower edge of the door, and means extending outwardly from said frame member for supporting engagement with said floor pan and said box-like member.

10. A running board and floor structure for a vehicle having a door and a longitudinally extending main frame member, comprising a pressed metal floor pan extended outwardly beyond said frame member and having a depending flange at its outer edge, a pressed metal sill plate secured at its inner edge in overlapping relation to the floor pan and extended outwardly, thence downwardly and thence inwardly to form three sides of a box-like member in which said depending flange forms the fourth side, said box-like member directly underlying the lower edge of the door, a cross member interposed between said pan and frame member and extended outwardly from the latter for bracing said box-like member.

11. A running board and floor structure for a vehicle having a door and a longitudinally extending main frame member, comprising a pressed metal floor pan extended outwardly beyond said frame member and having a depending flange at its outer edge, a pressed metal sill plate secured at its inner edge in overlapping relation to the floor pan and extended outwardly, thence downwardly and thence inwardly to form three sides of a box-like member in which said depending flange forms the fourth side, and means extending outwardly from said frame member for supporting said box-like member and also said floor pan between the box-like member and frame member.

12. A running board and floor structure for a motor vehicle having a longitudinally extending chassis frame member, a metal floor member extended outwardly a substantial distance from the frame member, a sill plate, said plate and floor member at the margin of the floor having portions forming together a longitudinal box-like member with the upper surface of the sill plate forming a running board, and a brace member secured to the frame member and extending outwardly for bracing said box-like member.

13. A running board and floor structure for a motor vehicle having a longitudinally extending chassis frame member, a metal floor member extended outwardly a substantial distance from the frame member, a sill plate, said plate and floor member at the margin of the floor having portions forming together a longitudinal box-like member with the upper surface forming a running board, and a brace member secured to the frame member and extending outwardly for bracing said box-like member, said brace member being interposed between the floor member and frame member and having a downwardly extending end secured to a vertical portion of said box-like member.

14. A running board and floor structure for a motor vehicle having a longitudinally extending chassis frame member, a metal floor member extended outwardly a substantial distance from the frame member, a sill plate, said plate and floor member at the margin of the floor having portions forming together a longitudinal box-like member with the upper surface forming a running board, a brace member secured to the frame member and extending outwardly for bracing said box-like member, said brace member being interposed between the floor member and frame member and having a downwardly extending end secured to a vertical portion of said box-like member, and an outwardly extending bracket attached to the frame member and underlying said brace member for supporting the same.

15. A running board and floor structure for a motor vehicle having a longitudinally extending chassis frame member, a metal floor member extended outwardly a substantial distance from the frame member, a sill plate, said plate and floor member at the margin of the floor having portions forming together a longitudinal box-like member with the upper surface forming a running board, a cross frame member overlying the chassis frame member and supporting the floor member, and a common bracket for supporting said cross member and box-like member from the chassis frame member.

16. A running board and floor structure for a vehicle having a longitudinally extending chassis frame, a pressed metal floor pan, a pressed metal sill plate, said floor pan terminating in a depending flange spaced outwardly from the chassis frame, said sill plate having an upper portion extending in a generally horizontal direction outwardly from the floor pan, the inner longitudinal edge of the plate overlying and being secured to the pan, said plate having at its outer margin a depending wall terminating in an inwardly extending bottom flange secured to said depending flange of the floor pan thereby forming therewith a longitudinal box-like member, and a brace member extended outwardly from the chassis frame member with a portion thereof in supporting relation to the floor pan and thence having a depending end portion secured to said depending flange of the floor pan.

17. A running board and floor structure for a motor vehicle having a longitudinally extending chassis frame member, a metal floor member extended outwardly a substantial distance from the frame member, a sill plate, said plate and floor member at the margin of the floor having portions forming together a longitudinal box-like member with the upper surface forming a running board, a cross frame member overlying the chassis frame member and supporting the floor member, and a common bracket for assisting in supporting said cross member and box-like member from the chassis frame member and secured to said cross frame member.

18. A running board and floor structure for a vehicle having a longitudinally extending chassis frame, a pressed metal floor pan, a pressed metal sill plate, said floor pan terminating in a depending flange spaced outwardly from the chassis frame, said sill plate having an upper portion extending in a generally horizontal direction outwardly from the floor pan, the inner longitudinal edge of the plate overlying and being secured to the pan, said plate having at its outer margin a depending wall terminating in an inwardly extending bottom flange secured to said depending flange of the floor pan thereby forming therewith a longitudinal box-like member, and a brace member extended outwardly from the chassis frame member and having a depending end portion secured to said box-like member.

19. In a motor vehicle, a longitudinal chassis frame member, a floor pan terminating in a longitudinal box-like member located a substantial distance outwardly from the chassis frame member, and a cross frame member overlying the chassis frame member and interposed between the same and said floor pan, said cross frame member extending outwardly and downwardly of said floor pan to provide a portion in supporting relation to the pan and having its end portion attached to a lower portion of said box-like member.

CLIFFORD B. DOTY.
TRYGVE VIGMOSTAD.